Feb. 9, 1926.
H. J. DORMAN
HARROW
Filed March 22, 1923
1,572,777
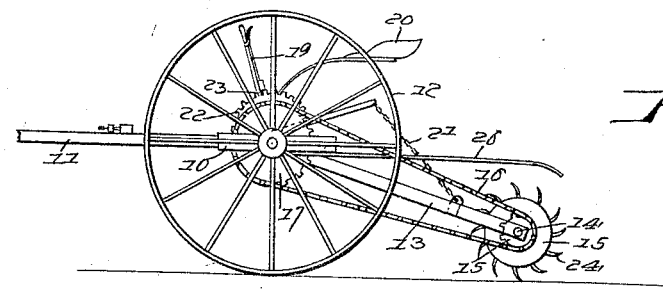
Fig. 1.
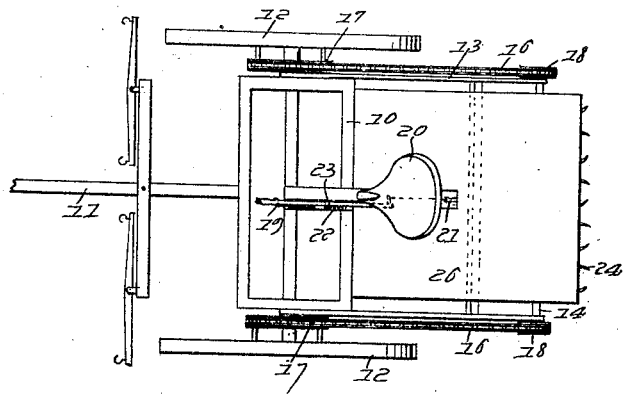
Fig. 2.
Fig. 4.
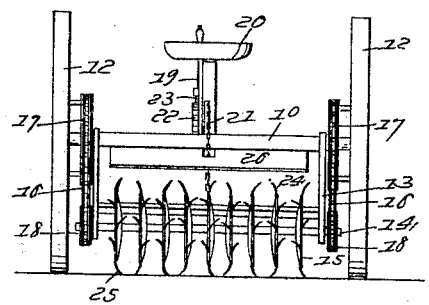
Fig. 3.
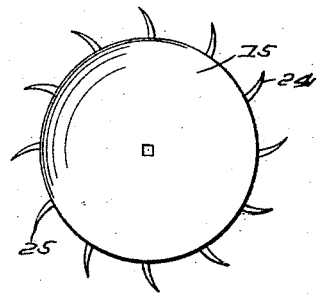
Inventor
Henry J. Dorman,
By
Attorney Patented Feb. 9, 1926.

1,572,777

UNITED STATES PATENT OFFICE.

HENRY J. DORMAN, OF BALD KNOB, ARKANSAS.

HARROW.

Application filed March 22, 1923. Serial No. 626,838.

*To all whom it may concern:*

Be it known that HENRY J. DORMAN, a citizen of the United States of America, residing at Bald Knob, in the county of White and State of Arkansas, has invented new and useful Improvements in Harrows, of which the following is a specification.

The object of the invention is to provide a harrow for general cultivating and soil preparing purposes wherein an increased efficiency may be secured in the pulverizing of the soil without adding materially to the horse power required in the operation thereof, and under conditions enabling the operator to closely observe the progress of the work; and with these objects in view the invention consists in a construction and combination of parts of which a preferred embodiment is shown in the accompanying drawings, wherein:—

Figure 1 is a side view, and

Figure 2 is a plan view of a harrow embodying the invention.

Figure 3 is a rear view of the same.

Figure 4 is a detail view of one of the harrow discs.

Upon a suitable frame 10 with which may be connected a draft tongue 11 is mounted a rotary axle 11 carrying the ground wheels 12 and fulcrumed upon said axle for swinging movement with reference thereto as an axle is a harrow frame 13 provided with a transverse spindle 14 carrying the harrow discs 15 and receiving rotary motion from the axle by means of chains 16 traversing sprocket wheels 17 and 18 respectively secured to said axle and spindle. To permit of varying the depth of operation of the discs an operating lever 19 within convenient reach of the driver's seat 20 is connected by a lifting chain 21 with harrow frame 13,—the lever being disposed to traverse a tooth edge segment 22 and having a dog 23 for holding the same in its adjusted positions.

The gearing consisting in this instance of the chains 16 and the sprockets 17 and 18 is of the speed multiplying type to the end that the discs are caused to rotate at a speed which is in excess of and is preferably a multiple of that of the drive shaft represented by the axle, and correspondingly the harrow discs are made of relatively small diameter so as to minimize the resistance offered thereto by contact with the soil, and in addition to the normal effect of cultivator discs the type herein shown and preferably employed embodies lateral spurs 24 which in cooperation with the teeth 25 which are arranged in the planes of the discs serve to effectually break up the lumps and leave a comparatively fine and smooth surface for seeding purposes.

Owing to the fact that the operation of the discs and reduced diameter and supplemental fingers or teeth tends to create a considerable amount of filling dust when the surface of the soil is is any way dry, it is preferred to provide the frame with a spanning dust fender 26 which is disposed below the driver's seat and in spanning relation with the frame. The fender is preferably secured to the frame and extends rearwardly from the latter, terminating beyond the vertical plane of the harrow spindle but sufficiently above the harow to permit the elevation of the latter to a point where it is free of the soil. The lifting chain 21 extends through a suitable opening in the fender. The fender lies in a horizontal plane with the exception of the rear extremity which is deflected downwardly.

Having described the invention, what is claimed as new and useful is:—

In a harrow, a main wheel-supported frame disposed horizontally, and a harrow frame consisting of side bars secured to the ends of the main frame and extending rearwardly and inclined downwardly, of a revolubly driven harrow journaled in the side bars, a fender secured to the under face of the main frame and extending rearwardly and deflected downwardly over the revoluble harrow, said fender having an elongated slot, means consisting of an angular lever mounted to swing on a fulcrum concentric with the wheels of the main frame, and an operative connection consisting of a chain passing through the slot and operatively connected to the side bars, whereby the harrow frame may be raised and lowered concentrically with the wheels of the main frame.

In testimony whereof he affixes his signature.

HENRY J. DORMAN.